(12) United States Patent
Allouche

(10) Patent No.: US 6,918,618 B2
(45) Date of Patent: Jul. 19, 2005

(54) JOINING MECHANISM FOR PVC PIPE

(75) Inventor: Erez Allouche, London (CA)

(73) Assignee: Ipex Inc., Verdun (CA)

( * ) Notice: Subject to any disclaimer, the term of this patent is extended or adjusted under 35 U.S.C. 154(b) by 25 days.

(21) Appl. No.: 10/373,083

(22) Filed: Feb. 26, 2003

(65) Prior Publication Data

US 2003/0214134 A1 Nov. 20, 2003

(30) Foreign Application Priority Data

Apr. 24, 2002 (CA) ............................................. 2383622

(51) Int. Cl.$^7$ .............................................. F16L 21/00
(52) U.S. Cl. ..................... 285/404; 285/309; 285/123.9
(58) Field of Search ............................. 285/305, 123.9, 285/123.11, 309, 321, 310, 403, 400, 404, 18, 89, 90

(56) References Cited

U.S. PATENT DOCUMENTS

| | | | |
|---|---|---|---|
| 2,353,121 A | | 7/1944 | Adam |
| 3,100,121 A | * | 8/1963 | Hillmer ........................ 285/321 |
| 3,585,803 A | * | 6/1971 | Bardgette ..................... 285/321 |
| 3,701,548 A | | 10/1972 | McGuire |
| 3,813,115 A | | 5/1974 | French |
| 3,863,959 A | * | 2/1975 | Blaschke ...................... 285/321 |
| 3,941,410 A | * | 3/1976 | Miyaoka ....................... 285/404 |
| 4,296,953 A | | 10/1981 | Nagao et al. |
| 4,318,639 A | | 3/1982 | Schosek |
| 4,348,956 A | * | 9/1982 | Schmidlin ..................... 285/403 |
| 4,363,505 A | | 12/1982 | Smith |
| 4,813,281 A | | 3/1989 | Daghe |
| 4,830,408 A | * | 5/1989 | Reimert ....................... 285/403 |
| 5,613,714 A | | 3/1997 | Toshima et al. |
| 5,662,360 A | | 9/1997 | Guzowski |
| 5,863,080 A | | 1/1999 | Svetlik |

* cited by examiner

Primary Examiner—Aaron Dunwoody
(74) Attorney, Agent, or Firm—Riches, McKenzie & Herbert LLP

(57) ABSTRACT

The present invention relates to a PVC-pipe, axially-tensioned joint. The pipe joint comprises a first PVC pipe having a spigot end, wherein the spigot end has a circumferential groove in and circumferentially around the outer surface of the spigot end. An inner ring is fitted into the groove in the spigot end and has a radial edge which forms a substantially radial shoulder circumferentially around the inner ring. The pipe joint also comprises a second PVC pipe having a bell end, wherein a plurality of angularly-spaced-apart holes extend radially through the bell end. The bell end of the second PVC pipe is fitted onto the spigot end of the first PVC pipe. There is a set of radial fasteners, wherein each given one of the radial fasteners extends through one of the plurality of angularly-spaced-apart holes in the bell end such that a first end portion of the fastener abuts against a shoulder of the inner ring.

13 Claims, 5 Drawing Sheets

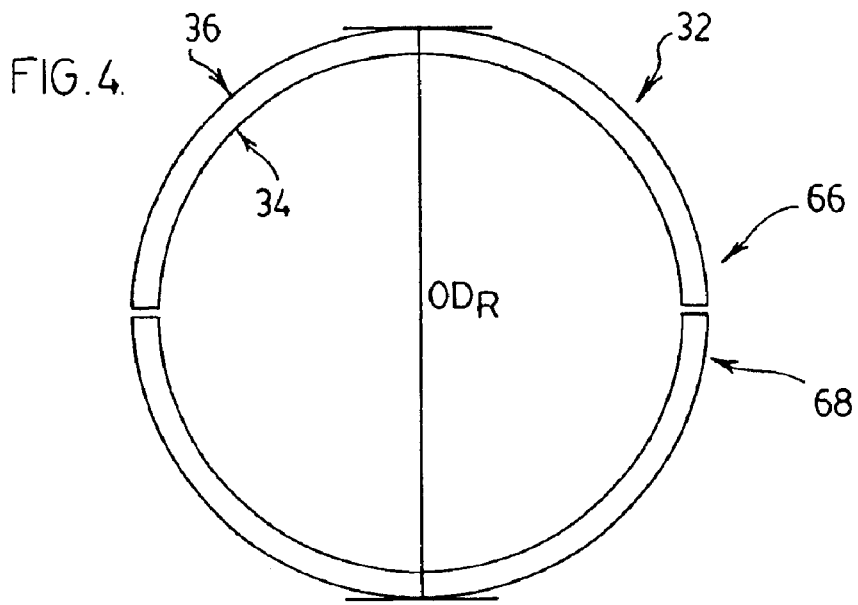
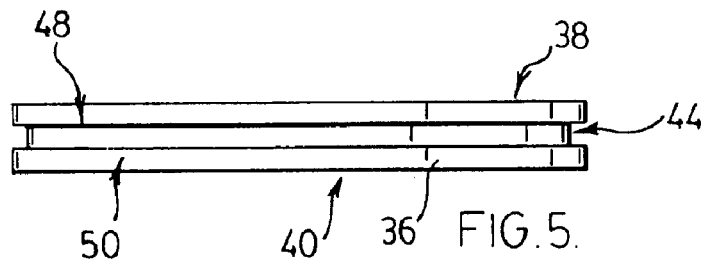
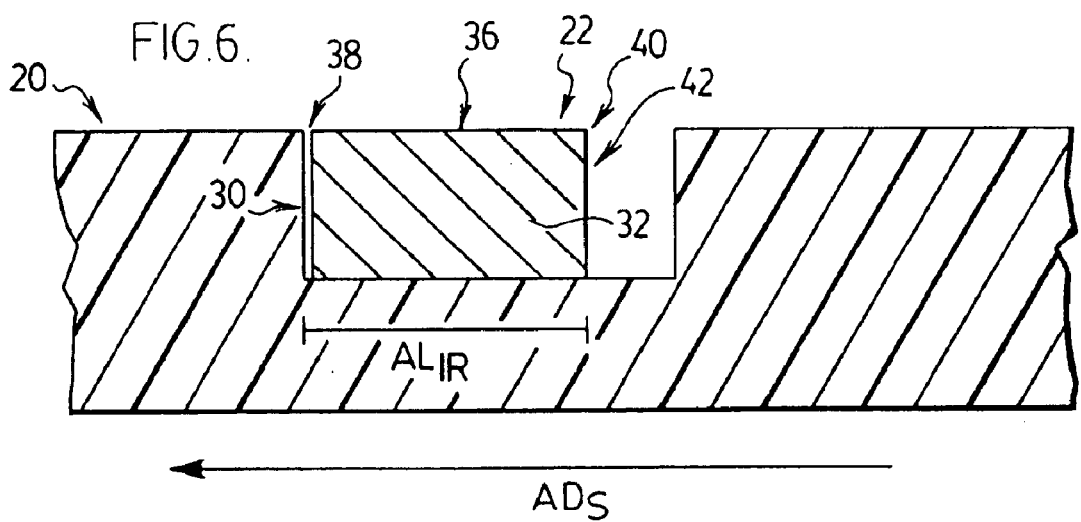

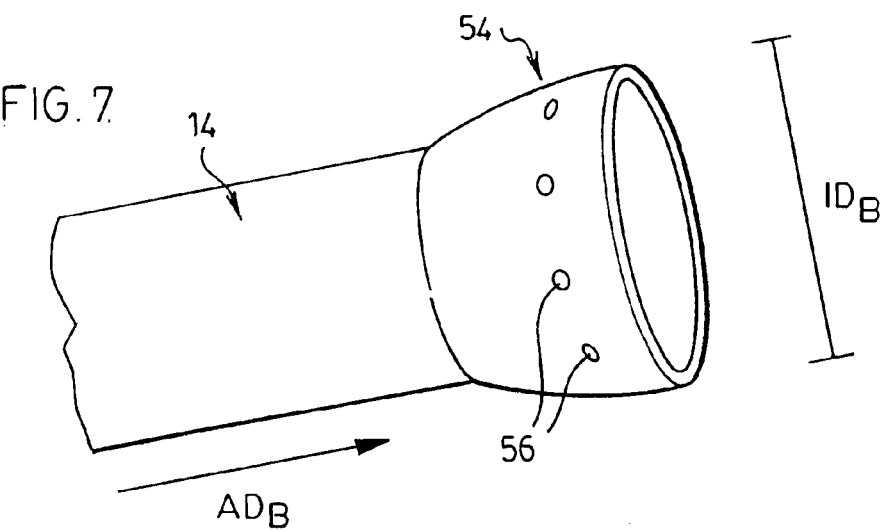
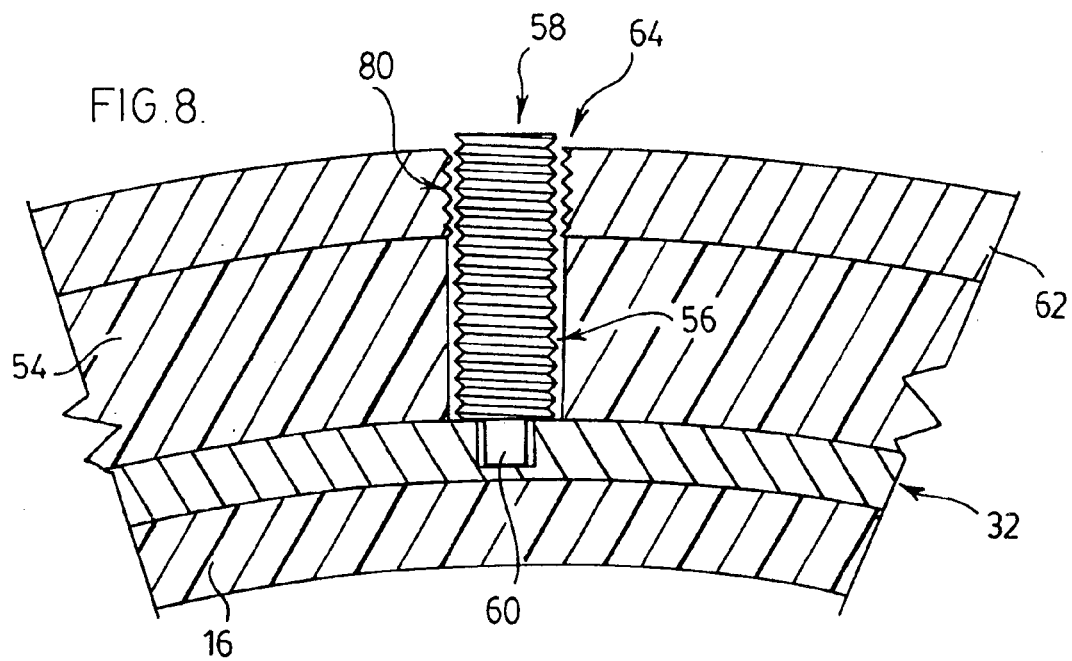

JOINING MECHANISM FOR PVC PIPE

FIELD OF THE INVENTION

The present invention relates to pipe joints. In particular, the present invention relates to PVC-pipe, axially-tensioned joints.

BACKGROUND OF THE INVENTION

Horizontal directional drilling is a method of installing underground pipelines. The drill head has the ability to turn and follow a curved path, thus allowing a horizontal bore to be made. The drill head continues in a straight path until it is turned upwards to the surface at a desired point. A pipeline is then pulled into and through the bore made by the drill head. This method of installing underground pipelines has become very popular because it has the advantage of not requiring an open-cut trench to be dug.

A major difficulty with horizontal directional drilling arises when installing the pipeline. As the pipeline is pulled into and through the bore, regular PVC pipes, which are connected by gasketed, push-on joints, tend to become separated due to axial forces which result from the pipeline being pulled through the bore.

The standard solution for preventing PVC pipes from becoming separated has been to use high density polyethylene or steel joints that are fusion welded together. However, welding is not a preferred process as the labour involved is relatively expensive. Furthermore, fusion welded joints are difficult to replace.

Other solutions include bell and spigot type joints wherein the spigot end of one pipe is inserted into the bell end of a second pipe and corresponding features on the bell and spigot ends interact to prevent the two pipes from separating. For example, U.S. Pat. No. 3,701,548 (McGuire) discloses a system for joining plastic pipes using a bell and spigot type joint. The bell portion of a first pipe end has a plurality of longitudinal passages circumferentially spaced therearound. A circumferential passage extends from one side of each longitudinal passage on the bell portion. The spigot portion of a second pipe end includes a plurality of lugs circumferentially spaced around and extending radially outward, which lugs are received in the longitudinal passages of the bell portion. The circumferential passages are positioned and shaped to draw a mating end of the spigot portion into a firm seating engagement with a seat within the bell portion upon relative rotation of the bell and spigot portions to move the lugs along the respective circumferential passages.

U.S. Pat. No. 3,813,115 (French) teaches a bell and spigot type joint for plastic pipes. The spigot end includes a continuous helical rib integrally formed with and protruding out from its external surface. The bell end includes a continuous helical groove formed integrally around its internal surface. The helical groove of the bell end receives the helical rib of the spigot end in a threaded fashion.

U.S. Pat. No. 5,662,360 (Guzowski) discloses an interlocking restraint plastic pipe joining system which includes pairs of female and male integral end connections. The female end connection has at least one depression within a mouth opening thereof. The male end connection has at least one protrusion formed on an exterior surface thereof which is adapted to matingly engage, in a snap fit fashion, the depression in the mouth opening of the female member.

Other solutions also include bell and spigot type joints which utilize bolts as fastening mechanisms. For example, U.S. Pat. No. 4,296,953 (Nago et al.) teaches a pipe joint for preventing a spigot from slipping off from a socket. The spigot and socket are provided with engaging members which are engageable with each other axially thereof. In one embodiment, headed bolts are inserted into the socket from outside through a hole in the socket wall and screwed into a threaded bore.

U.S. Pat. No. 4,318,639 (Schosek) discloses a plastic pipe connector fitting. In addition to using a threaded joint, Schosek discloses the use of lock bolts which are threaded through radially aligned threaded holes in the pipe sleeves. The inner end of each lock bolt is provided with a peripheral cutting edge and therefore, the ends of the plastic pipe need be pre-drilled.

SUMMARY OF THE INVENTION

An object of the present invention is to provide an improved PVC-pipe joint, particularly for use in horizontal directional drilling.

The present invention provides a bell and spigot type PVC-pipe joint which prevents pipes from separating when, for example the pipes are pulled into and through a bore, and there is a resulting force in the axial direction.

In accordance with a first aspect of the present invention, there is provided a PVC-pipe, axially-tensioned joint comprising:

a first PVC pipe having an axial direction, a spigot end and a first axial opening at the spigot end, wherein the spigot end has an outside diameter and an outer surface, and wherein there is a circumferential groove in and circumferentially around the outer surface of the spigot end, such that the groove has a bottom surface, a length in the axial direction, a forward radial edge and a trailing radial edge, wherein the forward radial edge is closer to the first axial opening of the first PVC than is the trailing radial edge and wherein the forward radial edge of the groove forms a substantially radial shoulder circumferentially around and in the spigot end of the first PVC pipe;

an inner ring having a bottom surface corresponding substantially to the bottom surface of the groove in the spigot end of the first PVC pipe, an outside diameter substantially the same as the outside diameter of the spigot end of the first PVC pipe and an outer surface, wherein the inner ring is fitted into the groove in an axial location in the axial direction in the spigot end of the first PVC pipe, and a forward radial edge of the inner ring abuts against the radial shoulder around and in the spigot end of the first PVC pipe and wherein the inner ring has a rearward radial edge which forms a substantially radial shoulder circumferentially around the inner ring;

a second PVC pipe having an axial direction and a bell end, wherein the bell end has an inside diameter greater than the outside diameter of the spigot end of the first PVC pipe, wherein the bell end of the second PVC pipe is fitted onto the spigot end of the first PVC pipe in substantially the same axial direction as the axial direction of the first PVC pipe, wherein there is a plurality of angularly-spaced-apart holes extending radially through the bell end of the second PVC pipe; and a set of radial fasteners wherein each given one of the radial fasteners extends through one of the plurality of angularly-spaced-apart holes extending radially in the bell end of the second PVC pipe such that a first end portion of the fastener abuts against the shoulder of the inner ring.

In a further aspect of the present invention, the PVC-pipe, axially-tensioned joint further comprises an outer ring having an inside diameter substantially the same as or greater than the outside diameter of the bell end of the second PVC pipe, wherein the outer ring is fitted onto the bell end of the second PVC pipe in substantially the same axial location as the axial location of the inner ring, wherein there is a set of angularly-spaced-apart holes extending radially through the outer ring, and wherein the radial holes extending through the outer ring are aligned axially and angularly to correspond with the holes in the bell end of the second PVC pipe, and wherein each given one of the radial fasteners extends through the corresponding radial holes in the outer ring.

In still a further aspect, there is a circumferential recess in and circumferentially around the outer surface of the inner ring and the recess has a forward radial edge closer to the first axial opening of the first PVC pipe than is a trailing edge of the recess, such that the forward radial edge of the recess forms a radial shoulder circumferentially around and in the inner ring.

The present invention thus provides an improved PVC-pipe joint for preventing pipes from becoming axially separated. A set of radial fasteners and one or more circumferential rings function to resist axial forces which result from pulling the pipes into and through a bore.

Advantageously, the PVC-pipe joint of the present invention is relatively easy and inexpensive to manufacture because it does not require complex features, such as a system of integral longitudinal and circumferential passages on one of the bell or spigot end with a corresponding system of integral lugs on the other of the bell or spigot end. In the present invention, a simple circumferential groove is formed in the spigot end of a first pipe and no corresponding integral protrusion or rib needs to be formed in the bell end of a second pipe.

BRIEF DESCRIPTION OF THE DRAWINGS

The drawings illustrate by way of example only preferred embodiments of the invention.

FIG. 4 is a perspective view of an embodiment of the inner ring of the present invention.

FIG. 5 is a side view of an embodiment of the inner ring of the present invention.

FIG. 6 is a longitudinal cross-sectional view of an embodiment of the spigot end of the present invention with the inner ring fitted into the circumferential groove.

FIG. 7 is a side view of an embodiment of the bell end of the present invention without the radial fasteners installed.

FIG. 8 is a transverse cross-sectional view of an embodiment of the present invention.

Similar references are used in different figures to denote similar components.

DETAILED DESCRIPTION OF PREFERRED EMBODIMENTS

The following description is of preferred embodiments is by way of example only and is without limitation to the combination of features necessary for carrying the invention into effect.

Figure 1:
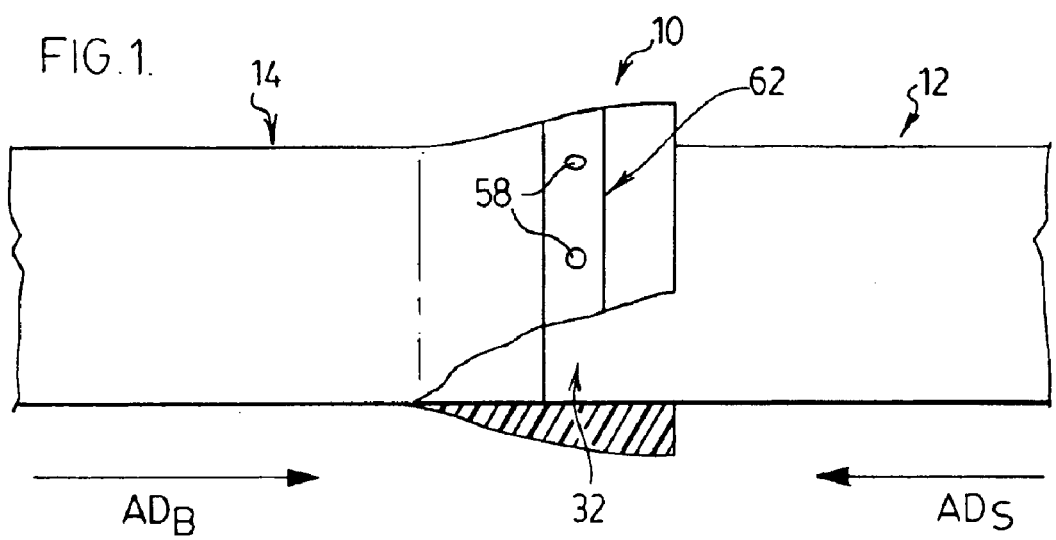
FIG. 1 is a plan view of an embodiment of the present invention with portions broken away to better illustrate the component parts.

As shown in FIG. 1, a PVC-pipe, axially-tensioned joint 10 functions to join a first PVC pipe 12 and a second PVC pipe 14.

Figure 2:
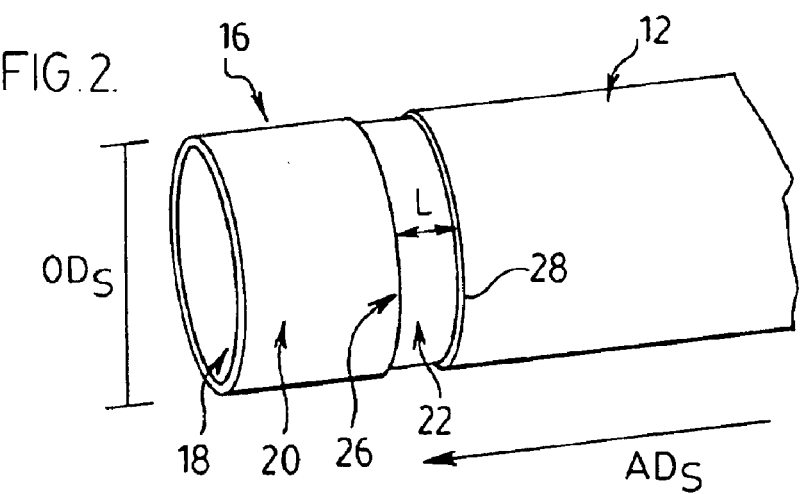
FIG. 2 is a side view of an embodiment of the spigot end of the present invention without the inner ring installed.
Figure 3:
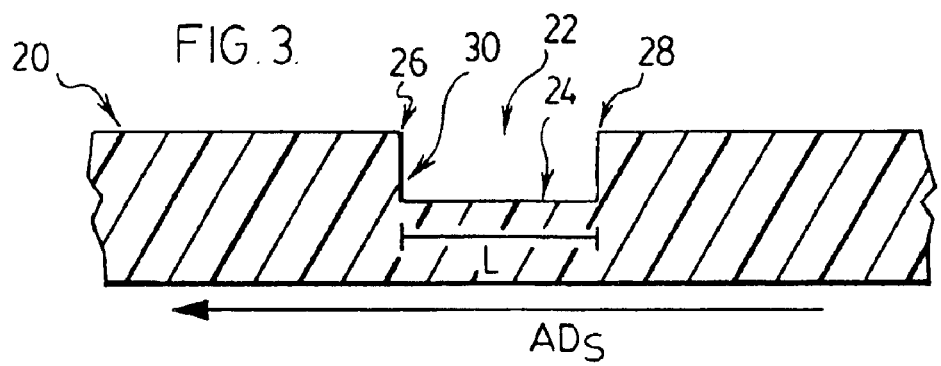
FIG. 3 is a longitudinal cross-sectional view of an embodiment of the spigot end of the present invention without the inner ring installed.

With reference to FIGS. 2 and 3, the first PVC pipe 12 has an axial direction $AD_S$, a spigot end 16 and a first axial opening 18 at the spigot end 16. The spigot end 16 has an outside diameter $OD_S$ and an outer surface 20. There is a circumferential groove 22 in and circumferentially around the outer surface 20 of the spigot end 16, such that the groove 22 has a bottom surface 24, a length L in the axial direction $AD_S$, a forward radial edge 26 and a trailing radial edge 28. The forward radial edge 26 is closer to the first axial opening 18 of the first PVC pipe 12 than is the trailing radial edge 28. Further, the forward radial edge 26 of the groove 22 forms a substantially radial shoulder 30 circumferentially around and in the spigot end 16 of the first PVC pipe 12.

FIGS. 4 and 5 illustrate one embodiment of an inner ring 32 having a bottom surface 34 corresponding substantially to the bottom surface 24 of the groove 22 in the spigot end 16 of the first PVC pipe 12. The inner ring 32 has an outside diameter $OD_R$ substantially the same as the outside diameter $OD_S$ of the spigot end 16 of the first PVC pipe 12 and an outer surface 36.

As illustrated in FIG. 6, another embodiment of the inner ring 32 is fitted into the circumferential groove 22 in an axial location $AL_{IR}$ in the axial direction $AD_S$ in the spigot end 16 of the first PVC pipe 12. A forward radial edge 38 of the inner ring 32 abuts against the radial shoulder 30 around and in the spigot end 16 of the first PVC pipe 12. In this embodiment, the inner ring 32 has a rearward radial edge 40 which forms a substantially radial shoulder 42 circumferentially around the inner ring 32.

With reference to FIG. 7, the second PVC pipe 14 has an axial direction $AD_B$ and a bell end 54. There is a plurality of angularly-spaced-apart holes 56 extending radially through the bell end 54 of the second PVC pipe 14. The bell end 54 has an inside diameter $ID_B$ greater than the outside diameter $OD_S$ of the spigot end 16 of the first PVC pipe 12.

As illustrated in FIG. 1, the bell end 54 of the second PVC pipe 14 is fitted onto the spigot end 16 of the first PVC pipe 12 in substantially the same axial direction $AD_B$ as the axial direction $AD_S$ of the first PVC pipe 12.

With reference to FIG. 8, there is provided a set of radial fasteners 58, wherein each given one of the radial fasteners 58 extends through one of the plurality of angularly-spaced-apart holes 56 extending radially in the bell end 54 of the second PVC pipe 14.

The radial fasteners are arranged such that a first end portion 60 of each radial fastener 58 abuts or contacts against the relevant radial shoulder of the inner ring 32. In the embodiment shown in FIG. 6, the first end portion 60 contacts or abuts against the shoulder 42 such that the axial forces are transferred from the radial fastener 58 to the radial shoulder 42 of the inner ring 32.

In the preferred embodiment described below wherein there is a circumferential recess 44 in the inner ring 32, and there is a radial shoulder 42 in the circumferential recess 44, preferably the first end portion 60 of the fastener 58 abuts against, or contacts, the radial shoulder 52 in order to transfer force from the fastener 58 to the inner ring 32.

Figure 9:
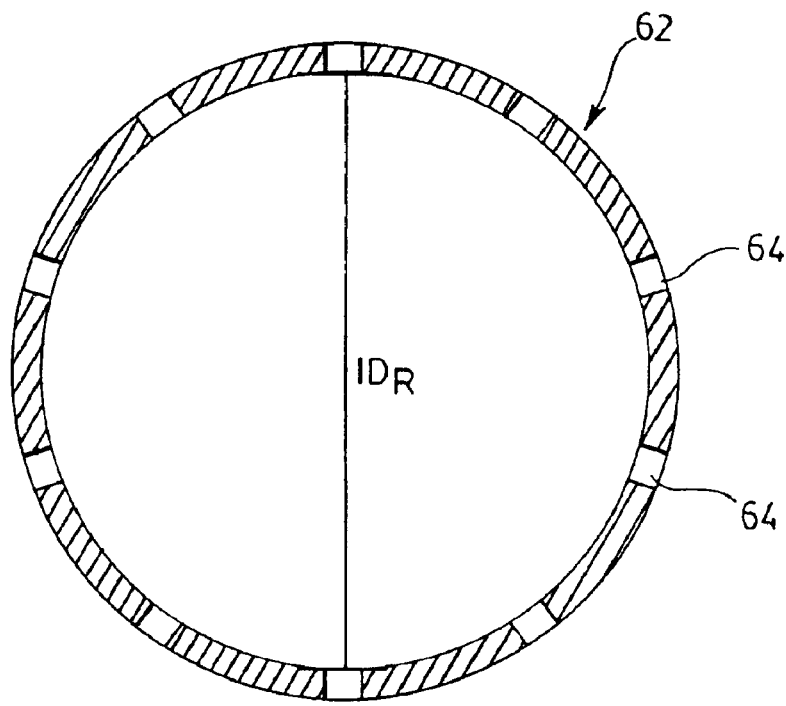
FIG. 9 is a perspective view of an embodiment of the outer ring of the present invention.
Figure 10:
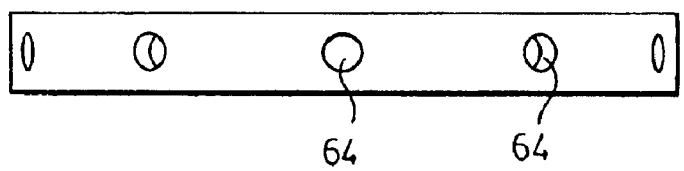
FIG. 10 is a side view of an embodiment of the outer ring of the present invention.

Preferably, the joint 10 further comprises an outer ring 62. FIGS. 9 and 10 illustrate an outer ring 62 which includes a set of angularly-spaced-apart holes 64 extending radially through the outer ring 62. The outer ring 62 has an inside diameter $ID_R$ substantially the same as or greater than the outside diameter $OD_B$ of the bell end 54 of the second PVC pipe 14.

Figure 11:
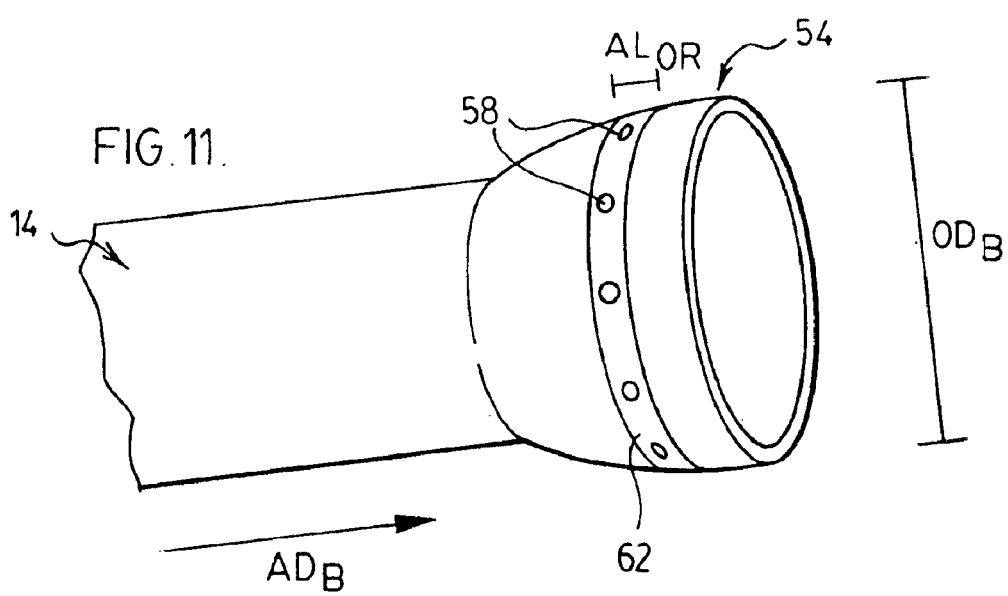
FIG. 11 is a side view of an embodiment of the bell end of the present invention with the outer ring and radial fasteners installed.

As illustrated in FIGS. 8 and 11, the outer ring 62 is fitted onto the bell end 54 of the second PVC pipe 14 in substantially the same axial location $AL_{OR}$ as the axial location $AL_{IR}$ of the inner ring 32. The radial holes 64 extending through the outer ring 62 are aligned axially and angularly to correspond to the holes 56 in the bell end 54 of the second PVC pipe 14. The radial fasteners 58 extend through the corresponding radial holes 64 in the outer ring.

Figure 12:
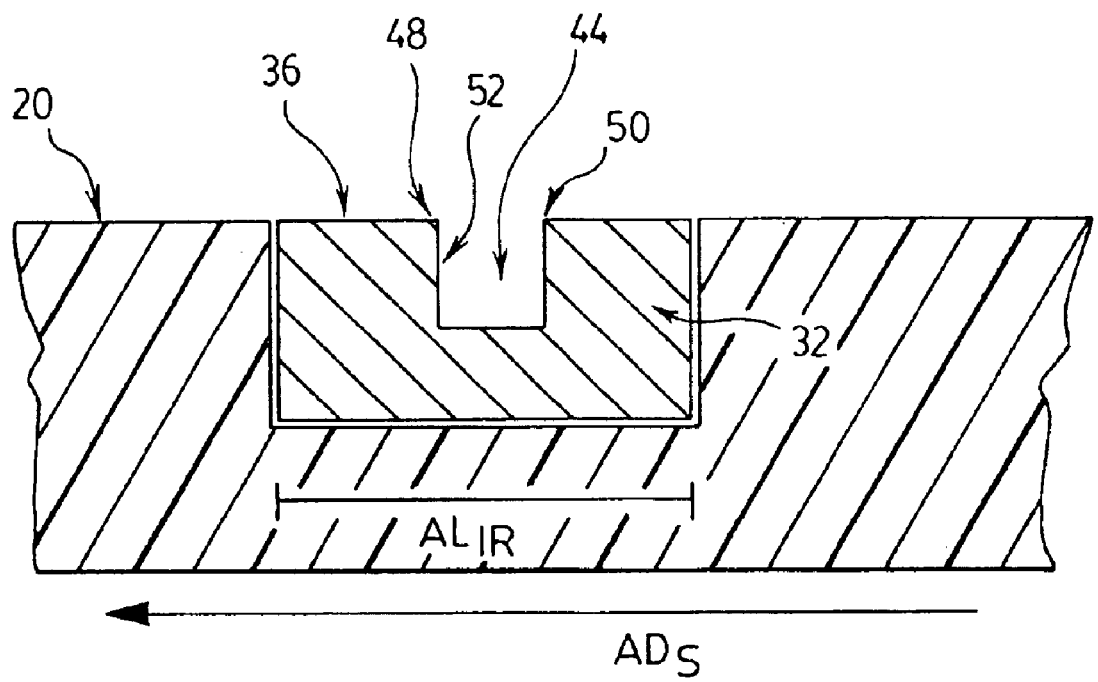
FIG. 12 is a longitudinal cross-sectional view of an embodiment of the spigot end of the present invention with the inner ring including a circumferential recess fitted into the circumferential groove.
Figure 13:
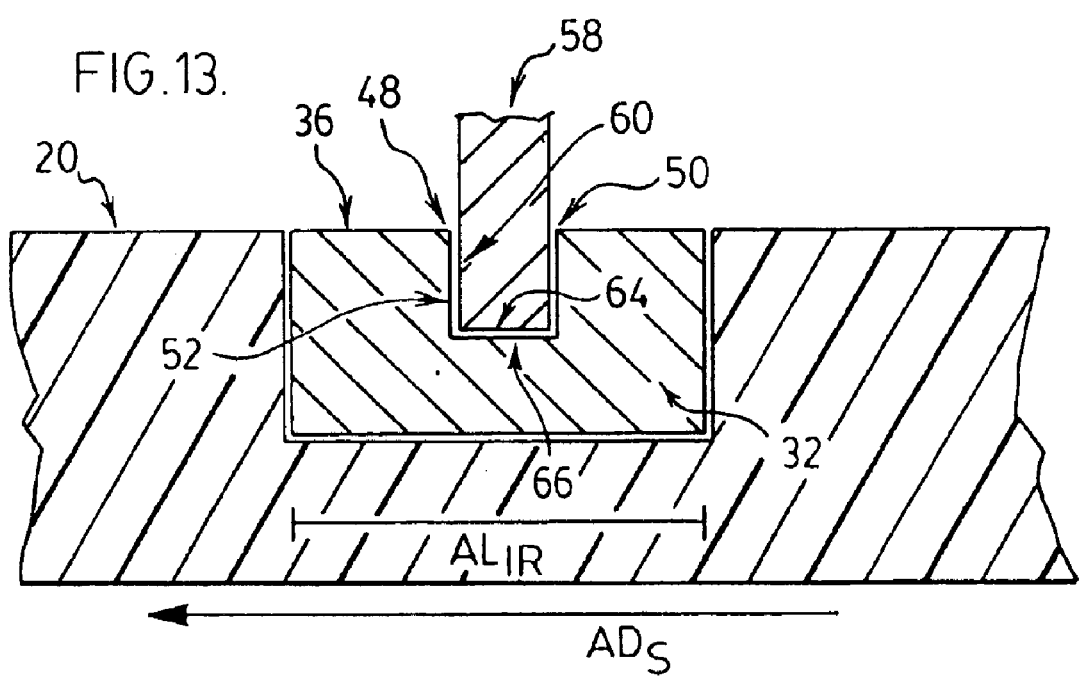
FIG. 13 is a longitudinal cross-sectional view of an embodiment of the spigot end of the present invention with the inner ring including a circumferential recess fitted into the circumferential groove and with a radial fastener installed.

In a preferred embodiment, there is a circumferential recess 44 in and circumferentially around the outer surface 36 of the inner ring 32, as shown in FIGS. 12 and 13. The circumferential recess 44 has a forward radial edge 48 closer to the first axial opening 18 of the first PVC pipe 12 than is a trailing edge 50 of the recess 44, such that the forward radial edge 48 of the recess 44 forms a radial shoulder 52 circumferentially around and in the inner ring 32. Preferably, the first end portion 60 of each fastener 58 contacts or abuts against the radial shoulder 52 of the circumferential recess 44 in the inner ring 32. Also, in another preferred embodiment, the very end 64 of each fastener 58 abuts against the bottom 66 of the recess 44 in the inner ring 32.

In another preferred embodiment, the inner ring 32 is formed with more than one angular sections. Specifically, the inner ring 32 comprises two or more individual sections which, when joined together, form the inner ring 32. More preferably, the inner ring is formed with two angular sections 66 and 68, as illustrated in FIG. 4. The angular sections 66 and 68 are separately fitted into the circumferential groove 22 in the spigot end 16 of the first PVC pipe 12 and together form the inner ring 32. The angular sections 66 and 68 may be joined by any suitable means including but not limited to welding, adhesives and mechanical fasteners.

Accordingly, it can be appreciated that the inner ring 32 need not be a continuous ring, but may have one or more gaps or interruptions, provided that the respective inner ring portions have sufficient circumferential length such that the relatively-focused or directed force being applied to the inner ring 32 through a radial fastener 58 is transferred through the portions of the inner ring to the radial shoulder 30 of the spigot end 16 of the first PVC pipe 12 such that the relatively-focused or directed force is spread across a relatively-greater portion of the radial shoulder 30.

The radial fasteners 58 of the present invention may be any suitable fastening devices. For example, the radial fasteners 58 can be, but are not limited to, bolts, screws or pins. Further, the radial fasteners can be made from any suitable material including but not limited to metal and plastic. In a preferred embodiment, each of the radial fasteners 58 is threaded and each of the holes 64 in the outer ring 62 is also threaded to receive one of the threaded radial fasteners 58.

It will be understood that, although various features of the invention have been described with respect to one or other of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments which are functional or mechanical equivalents of the specific embodiments and features that have been described and illustrated herein.

The embodiments of the invention in which an exclusive property or privilege is claimed are defined as follows:

1. A PVC-pipe, axially-tensioned joint comprising:
   a first PVC pipe having an axial direction, a spigot end and a first axial opening at the spigot end, wherein the spigot end has an outside diameter and an outer surface, and wherein there is a circumferential groove in and circumferentially around the outer surface of the spigot end, such that the groove has a bottom surface, a length in the axial direction, a forward radial edge and a trailing radial edge, wherein the forward radial edge is closer to the first axial opening of the first PVC pipe than is the trailing radial edge and wherein the forward radial edge of the groove forms a substantially radial shoulder circumferentially around and in the spigot end of the first PVC pipe;
   an inner ring having a bottom surface corresponding substantially to the bottom surface of the groove in the spigot end of the first PVC pipe, an outside diameter substantially the same as the outside diameter of the spigot end of the first PVC pipe and an outer surface, wherein the inner ring is fitted into the groove in an axial location in the axial direction in the spigot end of the first PVC pipe, and a forward radial edge of the inner ring abuts against the radial shoulder around and in the spigot end of the first PVC pipe and wherein the inner ring has a rearward radial edge which forms a substantially radial shoulder circumferentially around the inner ring;
   a second PVC pipe having an axial direction and a bell end, wherein the bell end has an inside diameter greater than the outside diameter of the spigot end of the first PVC pipe, wherein the bell end of the second PVC pipe is fitted onto the spigot end of the first PVC pipe in substantially the same axial direction as the axial direction of the first PVC pipe, wherein there is a plurality of angularly-spaced-apart holes extending radially through the bell end of the second PVC pipe;
   a set of radial fasteners wherein each given one of the radial fasteners extends through one of the plurality of angularly-spaced-apart holes extending radially in the bell end of the second PVC pipe such that a first end portion of the fastener abuts against the shoulder of the inner ring; and
   an outer ring having an inside diameter substantially the same as or greater than the outside diameter of the bell end of the second PVC pipe, wherein the outer ring is fitted onto the bell end of the second PVC pipe in substantially the same axial location as the axial location of the inner ring, wherein there is a set of angularly-spaced-apart holes extending radially through the outer ring, and wherein the radial holes extending through the outer ring are aligned axially and angularly to correspond with the holes in the bell end of the second PVC pipe, and wherein each given one of the radial fasteners extends through the corresponding radial holes in the outer ring.

2. A joint as defined in claim 1 wherein each of the radial fasteners is threaded at a second end portion and each of the holes in the outer ring is threaded to receive one of the threaded radial fasteners.

3. A joint as defined in claim 1 wherein there is a circumferential recess in and circumferentially around the outer surface of the inner ring and wherein the recess has a forward radial edge closer to the first axial opening of the first PVC pipe than is a trailing edge of the recess, such that the forward radial edge of the recess forms the radial shoulder circumferentially around and in the inner ring.

4. A joint as defined in claim 2 wherein there is a circumferential recess in and circumferentially around the outer surface of the inner ring and wherein the recess has a forward radial edge closer to the first axial opening of the first PVC pipe than is a trailing edge of the recess, such that the forward radial edge of the recess forms the radial shoulder circumferentially around and in the inner ring.

5. A joint as defined in claim 1 wherein the inner ring is formed with more than one angular section.

6. A joint as defined in claim 2 wherein the inner ring is formed with more than one angular section.

7. A joint as defined in claim 3 wherein the inner ring is formed with more than one angular section.

8. A joint as defined in claim 4 wherein the inner ring is formed with more than one angular section.

9. A joint as defined in claim 5 wherein the inner ring is formed with two angular sections.

10. A joint as defined in claim 6 wherein the inner ring is formed with two angular sections.

11. A joint as defined in claim 7 wherein the inner ring is formed with two angular sections.

12. A joint as defined in claim 8 wherein the inner ring is formed with two angular sections.

13. A joint as defined in claim 11 wherein each of the radial fasteners is threaded at a second end portion and each of the holes in the outer ring is threaded to receive one of the threaded radial fasteners.

\* \* \* \* \*